(12) United States Patent
Seshadrinathan et al.

(10) Patent No.: US 9,064,313 B2
(45) Date of Patent: Jun. 23, 2015

(54) ADAPTIVE TONE MAP TO A REGION OF INTEREST TO YIELD A LOW DYNAMIC RANGE IMAGE

(71) Applicants: Kalpana Seshadrinathan, Santa Clara, CA (US); Oscar Nestares, San Jose, CA (US)

(72) Inventors: Kalpana Seshadrinathan, Santa Clara, CA (US); Oscar Nestares, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 58 days.

(21) Appl. No.: 13/631,343

(22) Filed: Sep. 28, 2012

(65) Prior Publication Data

US 2014/0092012 A1    Apr. 3, 2014

(51) Int. Cl.
*G09G 3/36* (2006.01)
*G06T 5/00* (2006.01)

(52) U.S. Cl.
CPC ....... *G06T 5/007* (2013.01); *G06T 2207/20076* (2013.01); *G06T 2207/20208* (2013.01)

(58) Field of Classification Search
CPC ................ G09G 2320/0626; G09G 2320/066; G09G 2320/0686; G09G 2320/0271
USPC ............ 345/87, 89, 204, 690, 617, 629, 589; 382/254, 162, 233, 274, 307
See application file for complete search history.

(56) References Cited

U.S. PATENT DOCUMENTS

| 2006/0158462 A1* | 7/2006 | Toyama et al. | 345/629 |
| 2011/0188744 A1* | 8/2011 | Sun | 382/162 |
| 2013/0091430 A1* | 4/2013 | Zhai et al. | 715/716 |
| 2013/0335438 A1* | 12/2013 | Ward | 345/589 |

* cited by examiner

*Primary Examiner* — Jennifer Nguyen
(74) *Attorney, Agent, or Firm* — Jordan IP Law, LLC

(57) ABSTRACT

Technologies may provide for yielding a low dynamic range image. A logic architecture may be implemented to perform a global tone map operation on a high dynamic range image to yield a preview image. The logic architecture may also be implemented to perform a local tone map operation on a region of interest of a preview image to yield a low dynamic range image. Additionally, the logic architecture may be implemented to provide an image that includes a predetermined amount of image pixels that are not saturated. In addition, the logic architecture may be implemented to employ image view data to yield a low dynamic range image. Moreover, the logic architecture may be implemented to convert the region of interest into a region that includes the foveal region of a user. In one example, the tone map operation is performed entirely automatically and interactively.

29 Claims, 6 Drawing Sheets

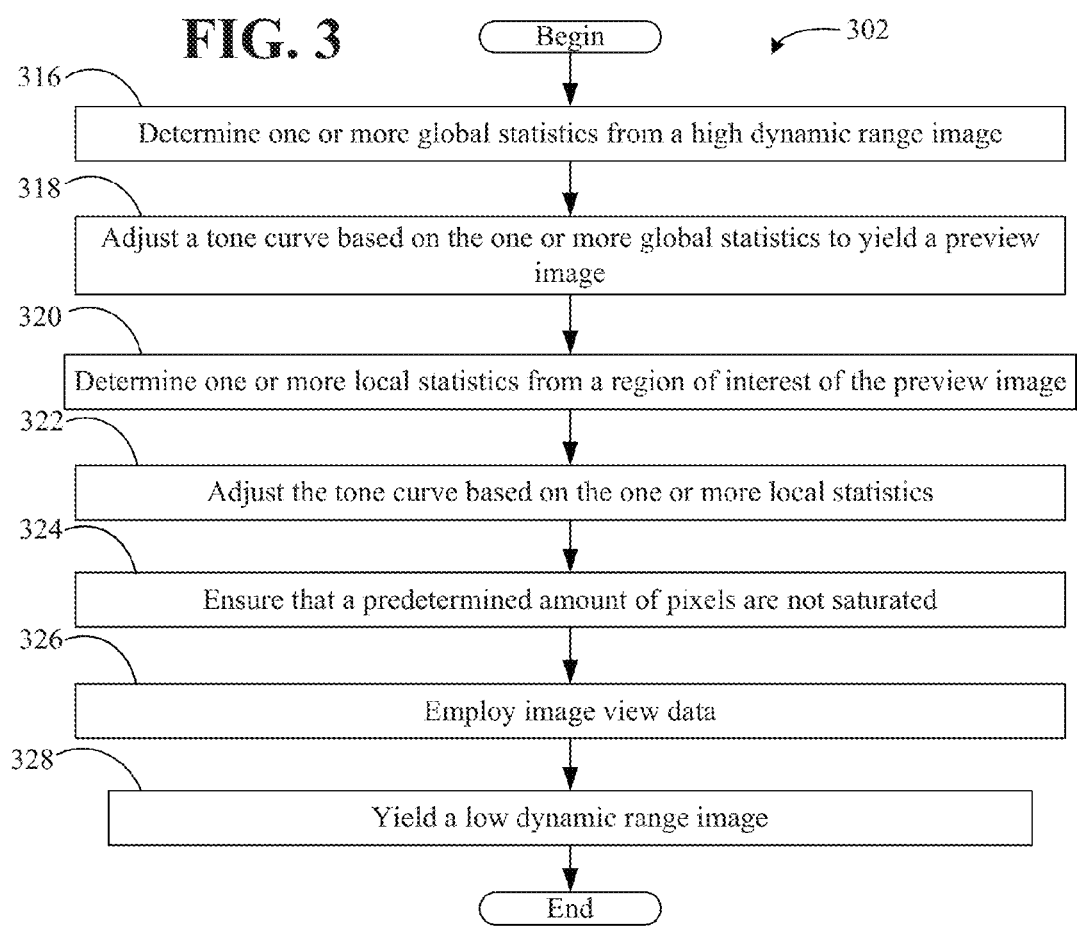
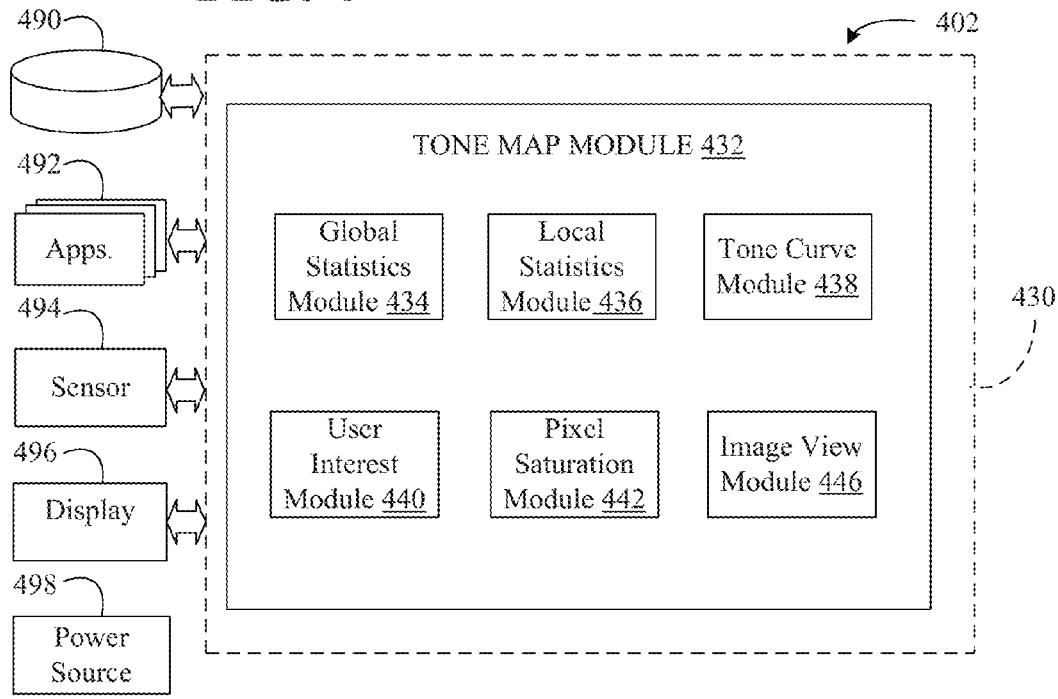

ADAPTIVE TONE MAP TO A REGION OF INTEREST TO YIELD A LOW DYNAMIC RANGE IMAGE

BACKGROUND

Embodiments generally relate to image processing. More particularly, embodiments relate to performing tone map operations on high dynamic range (HDR) images, to yield low dynamic range (LDR) images, as well as performing global tone map operations on the HDR image and local tone map operations on regions of interest (ROIs).

A tone map operation may be employed to render an HDR image on a display device having an LDR, wherein the rendered image may be static and not interactive, or may not reflect the adaptive characteristics of a visual system. Furthermore, the tone map operation may require a user to specify or modify an image tone, brightness, or contrast to yield an LDR image. Also, the tone map operation may unnecessarily preserve contrast in an area of an LDR image that is located outside of an ROI. Therefore, the rendered image may appear unrealistic, fail to reveal details or fail to maximize contrast in an ROI. Additionally, the rendered image may require a user to manually adjust tone, brightness or contrast, whether global or local. Indeed, the rendered image may compromise local image contrast of the ROI, or may not compromise global image contrast to the detriment of local image contrast.

BRIEF DESCRIPTION OF THE DRAWINGS

The various advantages of embodiments will become apparent to one skilled in the art by reading the following specification and appended claims, and by referencing the following drawings, in which:

FIGS. 1-3 are block diagrams of examples of methods to yield low dynamic range images according to embodiments;

FIG. 4 is a block diagram of an example of a logic architecture according to an embodiment;

DETAILED DESCRIPTION

Figure 1:
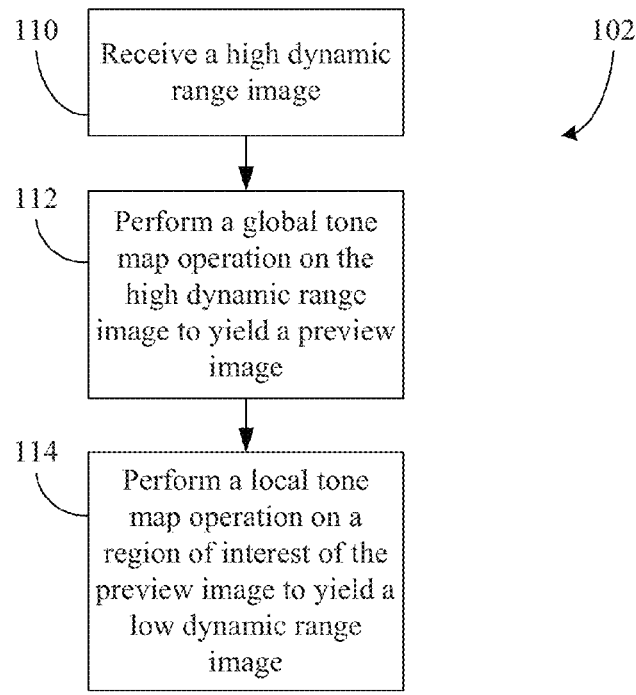

FIG. 1 shows a method 102 to yield a low dynamic range (LDR) image. The method 102 may be implemented as a set of logic instructions and/or firmware stored in a machine- or computer-readable storage medium (e.g., non-transitory computer-readable storage medium) such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), CMOS or transistor-transistor logic (TTL) technology, or any combination thereof. For example, computer program code to carry out operations shown in the method 102 may be written in any combination of one or more programming languages, including an object oriented programming language such as C++ or the like and conventional procedural programming languages, such as the "C" programming language or similar programming languages. Moreover, the method 102 could be implemented using any of the aforementioned circuit technologies.

Illustrated processing block 110 provides for receiving a high dynamic range (HDR) image. An HDR image may refer to a relatively high bit depth image, such as a 32-bit image. The HDR image may be received from a variety of sources, including online media servers, disk drives, hard drives, storage, image editing software, an image capture device such as a phone camera, a TV broadcast camera, a scanner, and so on, or combinations thereof. The HDR image may be received at any platform, such as a laptop, personal digital assistant (PDA), wireless smart phone, media content player, imaging device, mobile Internet device (MID), any smart device such as a smart phone, smart tablet, smart TV, and so on, or combinations thereof. The HDR image may also be received at any stage or component of an image pipeline, including a network interface component, memory, storage, decoder, demultiplexer, operating system, application, and so on, or combinations thereof.

Illustrated processing block 112 provides for performing a global tone map operation on the HDR image to yield a preview image. The global tone map operation may be performed at any time, such as when the HDR image is received at a stage or component of an image pipeline. For example, the global tone map operation may be performed when the HDR image is accessible to a tone map module, such as when the HDR image is retrievable from memory, storage, a hard disk, a disk drive, an image sensor, a network component, a scanner, an operating system, an application, and so on, or combinations thereof. The global tone map operation may be performed when the tone map module receives the HDR image, for example from memory, storage, a hard disk, a disk drive, an image sensor, a network component, a scanner, an operating system, an application, and so on, or combinations thereof. The global tone map operation may also be performed when the HDR image is generated, for example by an image capture device such as a camera. Moreover, the global tone map operation may be performed according to a predetermined period of time or event, for example according to a period of time or event set by a user, a resource allocation policy, resource availability, and so on, or combinations thereof.

Additionally, the global tone map operation may include a manual adjustment operation. For example, user input data that is indicative of an image parameter may be employed to manually adjust image tone, brightness, contrast, visibility, and so on, or combinations thereof. A user may also manually adjust a tone curve associated with an image. The global tone map operation may also include a combination of an automatic adjustment and a manual adjustment. For example, an automatic contrast adjustment operation may be performed in combination with a manual brightness adjustment operation.

In addition, the global tone map operation may be performed entirely automatically. For example, the global tone map operation may be performed entirely automatically without requiring, or irrespective of, user input data specifying an image parameter, such as image tone, brightness, contrast, visibility, and so on, or combinations thereof. The global tone map operation may also be performed entirely automatically without requiring, or irrespective of, user input data to manually modify a tone curve. Moreover, the global tone map operation may be performed entirely automatically without requiring, or irrespective of, user input data that is indicative of a region of interest (ROI). In one embodiment, the global tone map operation is performed entirely automatically based on the visibility of image details in both light and dark regions of an image. The global tone map operation may yield a preview image, which may be displayed to the user on a display device.

Illustrated processing block 114 provides for performing a local tone map operation on the ROI of a preview image. The ROI may refer to a region of an image that is of interest to a user, an observer, and so on. The ROI may include a point, a shape, a portion of an image, and so on, or combinations thereof. For example, the ROI may include a point on an image. The ROI may also include a rectangular shape, a circular shape, an oval shape, a triangular shape, and so on, which may surround or overlay a portion of the image. The ROI may further include a portion of an image, such as an object, which is to be selected or highlighted. The ROI may include an element of a landscape, such as sky, land, sea, an individual, and so on, which is to be selected or highlighted.

In one embodiment, the ROI is determined by employing user input data that is indicative of the ROI. For example, a user may view a preview image on a display device and use a mouse to point to, and select, a region of an image. A pointer sensor may capture the interaction, and pointer data that is indicative of the region may be employed to define the ROI. Similarly, the user may view a preview image on a display device and use a touch screen to touch a region of an image. A touch sensor may capture the interaction, and touch data that is indicative of the region may be employed to define the ROI. A user may also view a preview image on a display device and gaze at a region of an image. An image sensor may capture the interaction, and gaze data that is indicative of the region may be employed to define the ROI.

The ROI may be determined automatically by employing a combination of user input data, as described above, together with additional parameters, such as screen resolution, size and approximate viewing distance. As an example, if the user points to a pixel location using a pointer or a touch input device, an ROI that surrounds this user specified pixel location may be automatically determined with the aid of the additional parameters. Automatic ROI selection may provide the best user experience for the display by choosing, as one example, the foveal region of the user. In one embodiment, image view data including approximate view distance and screen resolution may be used to automatically convert the ROI to a region that includes the foveal region of a user.

The local tone map operation may be performed on the ROI at any time, such as when user input data that is indicative of the ROI is received at a stage or component of an image pipeline. For example, the local tone map operation may be performed when user input data that is indicative of the ROI is accessible to a tone map module, such as when the user input data is retrievable from memory, storage, a hard disk, a disk drive, an image sensor, a network component, a scanner, an operating system, an application, and so on, or combinations thereof. The local tone map operation may be performed when a tone map module receives user input data that is indicative of the ROI, for example from memory, storage, a hard disk, a disk drive, an image sensor, a network component, a scanner, an operating system, an application, and so on, and combinations thereof. The local tone map operation may be performed when user input data that is indicative of the ROI is generated. The local tone map operation may be performed according to a predetermined period of time or event, for example according to a period of time or event set by a user, a resource allocation policy, or resource availability, and so on, and combinations thereof.

The local tone map operation may include a manual adjustment operation. For example, user input data that is indicative of an image parameter may be employed to manually specify image tone, brightness, contrast, visibility, and so on, or combinations thereof. A user may also manually adjust a tone curve associated with a preview image. The local tone map also operation may include a combination of an automatic adjustment and a manual adjustment. For example, an automatic contrast adjustment operation may be performed in combination with a manual brightness adjustment operation.

The local tone map operation may also be performed entirely automatically. For example, the local tone map operation may be performed without requiring, or irrespective of, user input data specifying an image parameter, such as tone, brightness, contrast, visibility, and so on, or combinations thereof. In one embodiment, the local tone map operation may be performed entirely automatically, based on user input data that is indicative of the ROI. While user input data that is indicative of the ROI may be input manually, for example by a mouse click or a screen touch operation, the user input data may be automatically employed in the local tone map operation without requiring, or irrespective of, user input data specifying any image parameter. Also, user input data that is indicative of the ROI may be automatically employed in the local tone map operation without requiring, or irrespective of, manual adjustment of any tone curve. The user interaction that is employed to perform the local tone map operation may include the interaction of a user with the preview image to indicate the ROI, without, or irrespective of, any interaction to indicate an image parameter or to manually adjust a tone curve.

In one embodiment, the tone map operation is performed entirely automatically, without requiring a user to set or adjust an image tone curve or an image parameter, such as brightness, contrast, visibility, and so on, or combinations thereof. A tone map operation including an entirely automatic global tone map operation performed on an HDR image and an entirely automatic local tone map operation performed on an ROI may not compromise local image contrast of the ROI. The local tone map operation may yield a low dynamic range (LDR) image, which may refer to a relatively lower bit depth image such as an 8-bit image.

Figure 2:
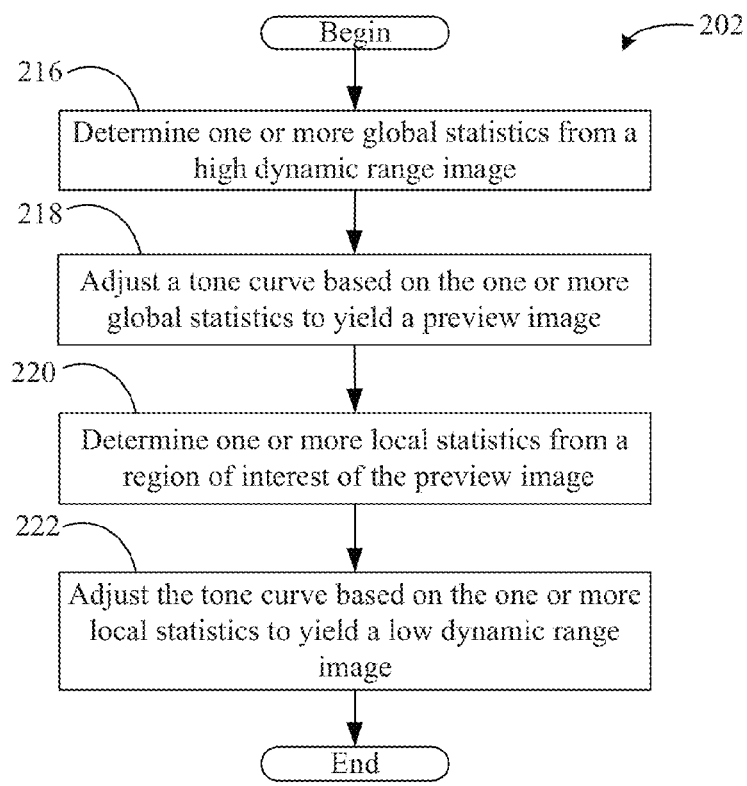

Turning now to FIG. 2, a method 202 provides for yielding the LDR image. The method 202 could be implemented using any of the herein mentioned technologies. For example, the method 202 could be implemented using any of the herein mentioned circuit technologies. The method 202 could also be implemented at any time, such as at generation, storage, or receipt of a high dynamic range image, of a preview image, of user input data that is indicative of an ROI, and so on, or combinations thereof. The method 202 could also be implemented at any stage or component of an image pipeline, such as a network interface component, memory, storage, decoder, demultiplexer, operating system, application, and so on, or combinations thereof.

Illustrated processing block 216 provides for determining one or more global statistics from an HDR image. In one embodiment, these global statistics may be determined from a histogram of the HDR image. The histogram may refer to a graphical representation indicative of a location of brightness level contained in an image, such as from the darkest level to the brightest level. The histogram may refer to a graphical representation of a tonal distribution in an image, and may plot the number of pixels for each tonal value. For example, the histogram may plot the number of pixels in an image (e.g., vertical axis) with a particular brightness value (e.g., horizontal axis). The global statistics determined from the histogram may include global image tonal range, minimum luminescence, maximum luminescence, percentile values, and so on, or combinations thereof.

Illustrated processing block 218 provides for adjusting the tone curve with one or more of the global statistics determined from the HDR image to yield a preview image. The tone curve may be associated with the HDR image, and may refer to a graphical representation of the tonal range of the HDR image demonstrating a progress from black, or dark, to white, or light. The tone curve associated with the HDR image may be adjusted with one or more of the global statistics determined from the HDR image, such that image details may be visible in both light and dark regions of the image. For example, the tone curve may be adjusted using a determined global percentile value, such that substantially all details in both the light and dark regions of an image may be visible. A preview image may be yielded, and may be associated with the tone curve that is adjusted with the determined global statistic.

In one embodiment, one or more global image statistics are utilized to tone map an image so that most regions of the HDR image are made visible. Presented herein is an illustrative implementation using a global tone map operation that employs a sigmoidal tone curve, which can be implemented relatively efficiently on various platforms. It is understood, however, that the process described may be applied with various other tone map operators with appropriate modifications readily apparent to one of ordinary skill in the art.

In one embodiment, performing a global tone map operation on a high dynamic range image to yield a preview image may include the following. Let I denote the HDR image, with $I_j$ denoting the pixel value at location j. One may tone map the HDR image followed by SRGB gamma transformation to generate an LDR image that can be displayed on an LDR display. Let L(I) denote the luminance of I with Lj(I) denoting the luminance at pixel location j. A tone mapped image T is then obtained using the following computation:

$$T = I\frac{L(T)}{L(I)} \quad (1)$$

$$L'_j(T) = \frac{1}{1 + be^{-sL_j(I)}} \quad (2)$$

$$L_j(T) = \frac{L'_j(T) - L'_{min}(T)}{L'_{max}(T) - L'_{min}(T)} \quad (3)$$

where b and s are parameters of the sigmoidal curve, and e refers to the exponential function. Equation (2) describes the sigmoidal mapping from input luminances to tonemapped luminances that are then converted to the range [$L'_{min}$(H), $L'_{max}$(H)] by Equation (3). $L'_{min}$(H) corresponds to the minimum allowable luminance (e.g., 1) and $L'_{max}$(H) corresponds to the maximum allowable luminance (e.g., $2^{16}$−1 in the case of a 16-bit HDR representation). The x- and (100-x)-percentile values of the histogram are determined per channel for a suitable value of x (for example, x=5). Values lower than $P_x$(T)=$\min_c$\{$P_x$(T,c)\} and values above $P_{100-x}$(T)=$\max_c$\{$P_{100-x}$(T,c)\} in T are clipped to these values. T is linearly re-scaled to the range [0,1]. The sRGB gamma transformation is applied to generate 8-bit images that can be displayed on LDR monitors.

Illustrated processing block 220 provides for determining one or more local statistics from an ROI. In one embodiment, the local statistics may be determined from a histogram of the preview image. The histogram may include the histogram that is adjusted with the one or more determined global statistics and that is associated with the preview image, a new histogram that is generated for the preview image and is representative of the image adjustment to the HDR image, and so on, or combinations thereof. Further, the ROI that is disposed in the preview image may be determined from user input data. For example, a user may gaze at an image, wherein a camera captures the interaction and forwards gaze data to define the ROI and determine the local statistic from the ROI. The gaze data may be employed to define a region of the preview image, such as a window, representative of the ROI. The local statistic determined from the ROI may include local image tonal range, minimum luminescence, maximum luminescence, percentile values, and so on, or combinations thereof.

Illustrated processing block 222 provides for adjusting a tone curve with one or more local statistics to yield an LDR image. The tone curve may be associated with the preview image. Additionally, the tone curve may include the tone curve that was adjusted with the one or more determined global statistics, a new tone curve that is generated for the preview image and is representative of the image adjustment to the HDR image, and so on, or combinations thereof. The tone curve associated with the preview image may be adjusted with one or more local statistics determined from the ROI, such that a resulting LDR image may provide more details of the ROI or maximize contrast in the ROI. For example, the tone curve associated with the preview image may be adjusted using a determined local percentile value such that substantially all detail in the ROI may be visible, or such that contrast of the ROI may be maximized. An LDR image may be yielded having increased contrast in the ROI without requiring a user to adjust the tone curve, brightness, contrast, and so on, or combinations thereof, of an image.

In one embodiment, performing the local tone map operation on the preview image to yield the LDR image may include the following operation. An input from the user may be considered to indicate a region of interest. The user input may be converted into a window W that corresponds to the region of interest that is indicated by the user. For example, W may correspond to a window of a specific size, or the foveal region of the user as they gaze at a point on which they click. W may also be an actual window provided by the user via a drawing tool. Let T(W) denote the pixels extracted from T, previously computed, using the window W. Compute the minimum and maximum values of T(W) across all the color channels and denote these values as $P_0$[T(W)] and $P_{100}$[T(W)], respectively. A relatively simple approach to perform adaptive tone mapping in accordance with embodiments may be to use $P_0$[T(W)] and $P_{100}$[T(W)] to clip T before linear re-scaling and SRGB gamma correction. Note that one may replace $P_x$(T) and $P_{100-x}$(T) in the global tone mapping with values that are computed using statistics within the user specified ROI.

FIG. 3 shows a method 302 of yielding an LDR image. The method 302 could be implemented using any of the herein mentioned technologies, at any of the herein mentioned times, at any of the herein mentioned stages or components of an image pipeline, and so on, or combinations thereof. Illustrated processing block 316 provides for determining one or more global statistics from an HDR image. Illustrated processing block 318 provides for adjusting a tone curve with the one or more global statistics determined from the HDR image to yield a preview image. Illustrated processing block 320 provides for determining one or more local statistics from an ROI. Illustrated processing block 322 provides for adjusting a tone curve with the one or more local statistics to yield an LDR image. In one embodiment, illustrated processing blocks 316, 318, 320 and 322 are the same as illustrated processing blocks 216, 218, 220 and 222, respectively, described with reference to FIG. 2.

Illustrated block 324 provides for ensuring that an amount of image pixels are not saturated. In the case of a red-green-blue (RGB) color device, an R, G, or B pixel value may be saturated when it takes on its maximum value. When pixels are saturated, information about a scene may be lost. Moreover, saturated pixels can lead to image artifacts. In one embodiment, the local tone map operation may provide, or ensure, that a percentage of pixels, for example 50% of pixels, are not to be saturated (e.g., black or white). The local tone map operation may provide, or ensure, that a percentage of pixels in the entire image are not to be clipped, for example 60% of pixels in the entire image are not to be clipped.

In one embodiment, ensuring that an amount of image pixels are not saturated may include the following operation. In a case where a substantially large portion of an image that is outside of the ROI may look black or white, a tone map operation may additionally require that at least Y % of pixels in the entire image are not clipped for a value of Y, for example a value 60%. Any value of Y may be employed.

An iterative process, to compute pixel values L and H such that Y % of pixels in T lie between L and H, may be employed. In one embodiment, set $L=P_0[T(W)]$ and $H=P_{100}[T(W)]$. Compute the percentile of the histogram of T corresponding to L and H. One may only use a single color channel, such as the green color channel, in this computation to maximize efficiency. Denote these percentiles using $x_L$ and $x_H$. Therefore, $x_L$ percentage of pixels in T are below L and $x_H$ percentage of pixels in T are below H. This defines three regions in the histogram of T based on the user input: $x_L$ percentage of pixels that are darker than the user specified ROI, $x_H-x_L$ percentage of pixels that belong to the user specified ROI, and 100 $x_H$ percentage of pixels that are brighter than the user specified ROI. If $x_H-x_L>Y$, the threshold is satisfied and we terminate the iteration. If $x_H-x_L<Y$, we decrement L and increment H alternately until the threshold is satisfied. If $x_L>100-x_H$, for every unit increment of $x_H$ we decrement $x_L$ by the $$\left\lceil \frac{x_L}{100 - x_H} \right\rceil$$

units. Conversly, if $x_L<100-x_H$, for every unit decrement of $x_L$, we increment $x_H$ by units $$\left\lceil \frac{100 - x_H}{x_L} \right\rceil$$

units. Here, $\lceil \cdot \rceil$ denotes a ceiling operator. This approach may help increase the speed of convergence as the histogram is being expanded where most room is available.

Once L and H are computed using the example iteration above, these values are used to clip T before linear re-scaling and SRGB gamma correction. The resulting image is then displayed to the user on a display device.

Illustrated block 326 provides for employing image view data to yield the LDR image. The image view data may include a view property, such as a view distance to indicate a distance that a user or observer is to view an image. Other view properties may include a display size to indicate the size of a display or application window that may display an image to the user, a display resolution to indicate the resolution of a display or application window that may display the image, and so on, or combinations thereof. The image view data may be specified manually, may be determined based on general view properties, such as characteristic view distance for a user or platform, or may be determined based on data indicative of actual distance, size, resolution, and so on, or combinations thereof.

In one embodiment, image view data including view distance and monitor resolution may be used to convert the ROI to a region that includes the foveal region of a user. The foveal region of a user may refer to a region that is sampled by an observer at maximum resolution (in the fovea) and is seen in maximum detail. The local tone map operation may be performed on the region that includes the foveal region to generate a locally tone mapped region. The locally tone mapped region may be enlarged, may be displayed to the user, and so on, or combinations thereof. In another embodiment, a display device may zoom the ROI to maximize visibility in the region. For example, the ROI may be enlarged (e.g., zoom out), may be reduced (e.g., zoom in), and so on, or combinations thereof. The view data, including view distance and monitor resolution, may be employed to determine a zoom factor to ensure that a resulting LDR image may occupy the user foveal region.

Illustrated block 328 provides for yielding an LDR image. In addition to the aforementioned properties of a resulting image, such as relatively increased visibility and maximized contrast of the ROI, a resulting LDR image may be provided that substantially avoids pixel saturation in relatively large portions of an image when an ROI is disposed in extremes of the dynamic range of the image, or avoids pixel saturation for regions outside of the ROI. A resulting LDR image may be provided that includes an ROI having the foveal region of a user. A resulting LDR image may be provided that includes an enlarged ROI.

Turning now to FIG. 4, an apparatus 402 includes a logic architecture 430 to yield an LDR image. The logic architecture 430 may be generally incorporated into a platform such as a laptop, personal digital assistant (PDA), wireless smart phone, media player, imaging device, mobile Internet device (MID), any smart device such as a smart phone, smart tablet, smart TV and so on, or combinations thereof. The logic architecture 430 may be implemented in an application, operating system, media framework, hardware component, or combinations thereof. The logic architecture 430 may be implemented in any component of an image pipeline, such as a network interface component, memory, processor, hard drive, memory, decoder, operating system, application, and so on, or combinations thereof. For example, the logic architecture 430 may be implemented in a processor, such as central processing unit (CPU) or a graphical processing unit (GPU), a shader, such as a GPU shader, visual processing unit (VPU), a sensor, an application, and so on, or combinations thereof. The logic architecture could also be implemented at any time, such as at generation, storage, or receipt of an HDR image, of a preview image, or of user input data indicative of an ROI, and so on, or combinations thereof. The apparatus 402 may include a power source 498, such as a battery, a power connector, and so on, or combinations thereof.

In the illustrated example, the logic architecture 430 includes a tone map module 432 to perform a global tone map operation on an HDR image to yield a preview image, and to perform a local tone map operation on an ROI to yield an LDR image. The HDR image may be received at the logic architecture 430 from a variety of sources, from any platform, at any stage or component of an image pipeline, and so on. For example, the HDR image may be received from storage 490, applications 492, a sensor 494, a network interface component (not shown), and so on, or combinations thereof.

The illustrated tone map module 432 includes a global statistics module 434 to determine one or more global statistics from the HDR image. In one embodiment, the one or more global statistics may be determined from a histogram of the HDR image. The one or more global statistics determined from the HDR image may include global image tonal range, minimum luminescence, maximum luminescence, percentile values, and so on, or combinations thereof. The illustrated tone map module 432 also includes a local statistics module 436 to determine one or more local statistics from the ROI. In one embodiment, the one or more local statistics may be determined from a histogram of a preview image. The one or more local statistics determined from the ROI may include local image tonal range, minimum luminescence, maximum luminescence, percentile values, and so on, or combinations thereof.

The tone map module 432 includes a tone curve module 438 to adjust a tone curve. In one embodiment, the tone curve module 438 may adjust a tone curve based on the one or more global statistics determined by the global statistics module 434 to yield a preview image. For example, the tone curve associated with the HDR image may be adjusted with the one or more global statistics, including determined global percentile values, such that image details may be visible in both light and dark regions of the preview image. In another embodiment, the tone curve module 438 may adjust a tone curve based on the one or more local statistics determined by local statistics module 436 to yield the LDR image. For example, the tone curve associated with the preview image may be adjusted based on the one or more local statistic, including determined local percentile values, such that substantially all detail in the ROI may be visible, or such that contrast of the ROI may be maximized.

The illustrated tone map module 432 also includes a user interest module 440 to determine an ROI. In one embodiment, the user interest module 440 may determine the ROI based on user input data. For example, a user may view a preview image on a display 496, application 492, and so on, or combinations thereof. The user may employ a mouse to point to, and select, a region of the preview image that is of interest to the user. The sensor 494 may include a pointer sensor to capture and forward pointer data indicative of the interaction to the user interest module 440, which may determine the ROI using the pointer data.

Similarly, the sensor 494 may be a touch sensor to capture and forward touch data indicative of an interaction to the user interest module 440, which may determine the ROI using the touch data. Also, the sensor 494 may include an image sensor to capture and forward image data indicative of an interaction to the user interest module 440, which may determine the ROI using the image data. In one embodiment, the user interest module 440 may convert the pointer data, touch data, image data, and so on, to define a portion of the preview image, such as a window, representative of the ROI. An LDR image may be presented, for example on the display 496, such that substantially all detail in the ROI may be visible. An LDR image may be provided such that contrast of the ROI may be maximized.

The tone map module 432 includes a pixel saturation module 442 to yield an LDR image that includes an amount of image pixels that are not saturated. The local tone map operation may employ the pixel saturation module 442 to provide, or ensure, that a percentage of pixels, for example 50% of pixels, are not to be saturated (e.g., black or white). The local tone map operation may employ the pixel saturation module 442 to provide, or ensure, that a percentage of pixels in the entire image are not to be clipped, for example 60% of pixels in the entire image are not to be clipped. In one embodiment, the pixel saturation module 442 performs an iterative process to determine image pixel values that operate as boundary values, such that an amount (e.g., percentage) of image pixels in the entire image that are not to be clipped fall in the range between the determined image pixel values. The determined image pixel values may be provided to the tone curve module 438 to clip a tone mapped image before rescaling or correction. A resulting LDR image may be provided that substantially avoids pixel saturation in relatively large portions of the image when the ROI is disposed in extremes of the dynamic range of the image, or avoids pixel saturation for regions that are outside of the ROI.

The illustrated tone map module 432 also includes an image view module 446 to provide image view data to yield an LDR image. The image view data may include a view property. The image view data may be specified manually, or may be determined, for example based on general or actual image view properties. In one embodiment, the sensor 494 may be an image sensor, such as a camera, to capture and forward image view data indicative of an actual view distance and an actual display resolution. The image view module 446 may receive the image view data and automatically convert the ROI to one that includes a foveal region of the user. The foveal region may be used to determine local statistics related to the ROI, which may be employed to adjust a tone turve and yield the LDR image. In another embodiment, a view distance and a display resolution may be accessed at storage 490 by image view module 446, which may determine a zoom factor. A zoom factor may be employed to enlarge or reduce the ROI, or to ensure that a resulting LDR image may occupy the foveal region of the user. The image view data may be provided to the tone curve module 438 to yield the LDR image.

In one embodiment, the logic architecture 402 may automatically perform a tone map operation. The tone map module 432 may automatically perform a global tone map operation when an HDR image is provided. The tone map module 432 may automatically perform a local tone map operation when an ROI is determined. In one embodiment, a tone map operation may include automatically determining one or more global statistics, adjusting a tone curve based on the one or more global statistics, determining one or more local statistics from a region of interest, adjusting a tone curve based on the one or more local statistics, ensuring that an amount of image pixels are not saturated, and employing image view data to yield an LDR image.

An LDR image may be provided without requiring, or irrespective of, a user to manually adjust the tone curve, brightness, contrast, and so on, or combinations thereof, of an image. While separate modules are shown, it is to be understood that an embodiment of logic architecture 402 may include one or more modules combined.

Figure 5:
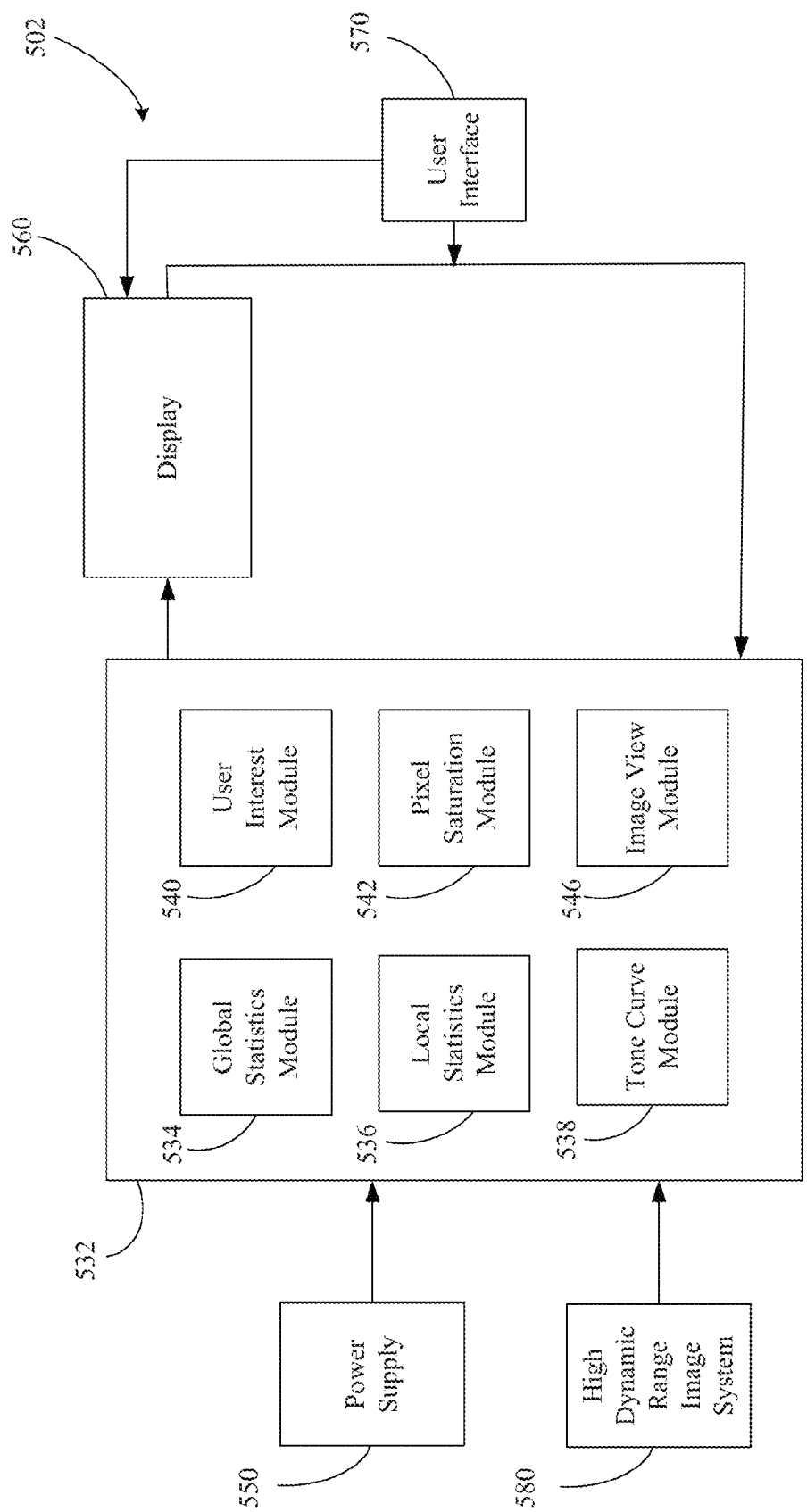
FIG. 5 is a block diagram of an example of a system according to an embodiment.

FIG. 5 shows a block diagram of an example of a system 502 including logic to yield an LDR image. The system 502 includes a tone map module 532 to perform a global tone map operation on an HDR image to yield a preview image, and to perform a local tone map operation on an ROI of a preview image to yield an LDR image. The system 502 may also include other system components such as a power supply 550, display 560, user interface 570, system memory (not shown), mass storage (not shown), or network interface component (not shown), and so on. Moreover, the system 502 may include dedicated components to receive or process an image, such as a dedicated graphic component including dedicated graphics memory (not shown).

In one embodiment, the tone map module 532 includes a global statistics module 534 to determine one or more global statistics from the HDR image. Moreover, the tone map module 532 includes a local statistics module 536 to determine one or more local statistic from the ROI. In addition, the tone map module 532 includes tone curve module 538 to adjust a tone curve based on the one or more global statistics to yield the preview image, and to adjust a tone curve based on the one or more local statistics to yield the LDR image.

Additionally, the tone map module 532 includes a user interest module 540 to determine the ROI. In one embodiment, the user interest module 540 may determine the ROI based on user input data. The tone map module 532 may include a sensor (not shown) to capture data indicative of the ROI. For example, the system 502 may include a pointer sensor to capture pointer data, a touch sensor to capture touch data, an image sensor to capture image data, and so on, or combinations thereof. The sensor may, for example, be housed in the display 560. In addition, tone map module 532 may include a pixel saturation module 542 to yield an LDR image that includes a predetermined amount of image pixels that are not saturated. Moreover, the tone map module 532 may include an image view module 546 to provide image view data to yield the LDR image.

The system 502 may receive an HDR image from an HDR image system 580. The HDR imaging system 580 may be incorporated in the same platform as the other components of the system 502, or may be physically mechanically separate from one or more components of the system 502. In one embodiment, the tone map module 532 receives the HDR image from the HDR image system 580, and the global statistics module 534 determines one or more global statistics from HDR image. The tone curve module 538 adjusts a tone curve with the one or more global statistics to yield a preview image that is forwarded to the display 560 for viewing. A user may interact with the preview image via a user interface 570, such as a mouse, or via the display 560, using a touch screen, and so on, or combinations thereof. In one embodiment, the user interface 570 may be a touch screen of a display device. User data indicative of the interaction between the user and the preview image is forwarded back to user interest module 540, which is then used to determine the ROI.

The local statistics module 536 determines one or more local statistics from the ROI. The tone curve module 538 adjusts a tone curve with the one or more local statistics to yield an LDR image. In one embodiment, the local tone map operation may employ the pixel saturation module 542 to yield an LDR image that includes a predetermined amount of image pixels that are not saturated. In another embodiment, the image view module 446 may provide image view data to the tone curve module 538 to yield the LDR image. While examples have illustrated separate modules, it is apparent that one or more of the modules 534, 536, 538, 540, 542, and 546 may be implemented in one or more combined modules.

In one embodiment, the system 502 may automatically perform one or more tone map operations. More particularly, the tone map module 532 may automatically perform a global tone map operation when the HDR image is provided. The tone map module 532 may also automatically perform a local tone map operation when the ROI is determined. In one embodiment, a tone map operation may include automatically determining one or more global statistics, adjusting a tone curve based on the global statistic, determining one or more local statistics from a region of interest, adjusting a tone curve based on the local statistic, ensuring that an amount of image pixels are not saturated, and employing image view data to yield a LDR image. An LDR image may be provided without requiring, or irrespective of, a user to manually adjust the tone curve, brightness, contrast, and so on, or combinations thereof, of an image.

Figure 6A:
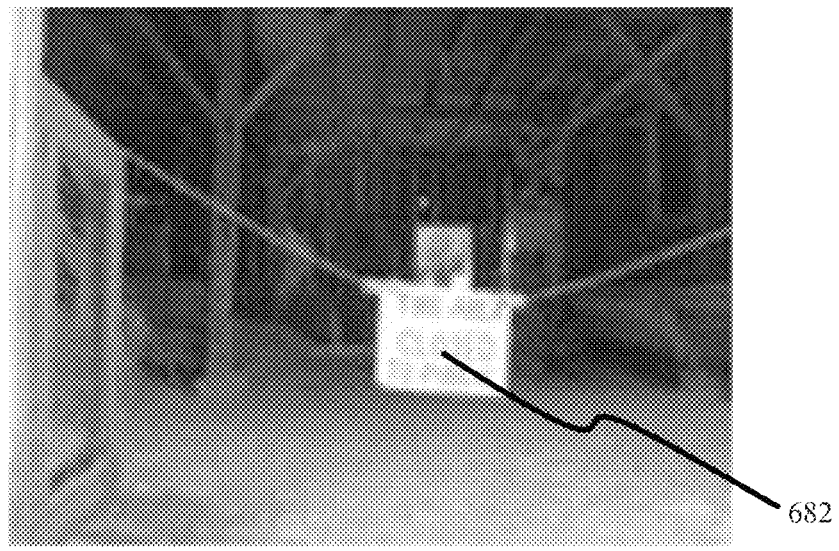
FIGS. 6A and 6B are screenshots of examples of low dynamic range images according to embodiments.
Figure 6B:
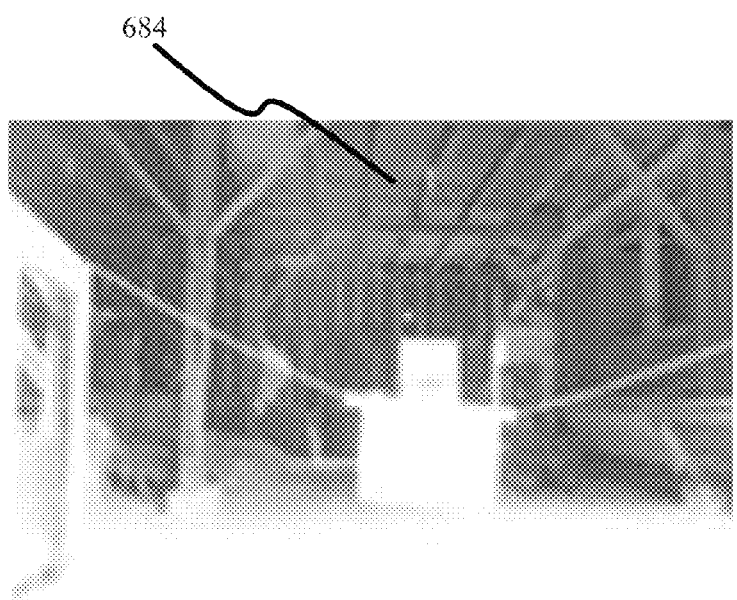

Turning to FIG. 6A, a screenshot of an LDR image 602 is shown. The LDR image 602 may be yielded by any of the herein mentioned technologies. The LDR image 602 includes an ROI 682 having substantially all of the details therein visible. The LDR image 602 is provided such that contrast of the ROI 682 is maximized. In one embodiment, contrast of the ROI 682 may not be compromised, or may be maximized. Similarly, FIG. 6B shows a screenshot of an LDR image 604 including ROI 684 having substantially all of the details therein visible. The LDR image 604 is provided such that contrast of the ROI 684 is maximized. In one embodiment, contrast of the ROI 684 may not be compromised, or may be maximized at the expense of global contrast.

Figure 7:
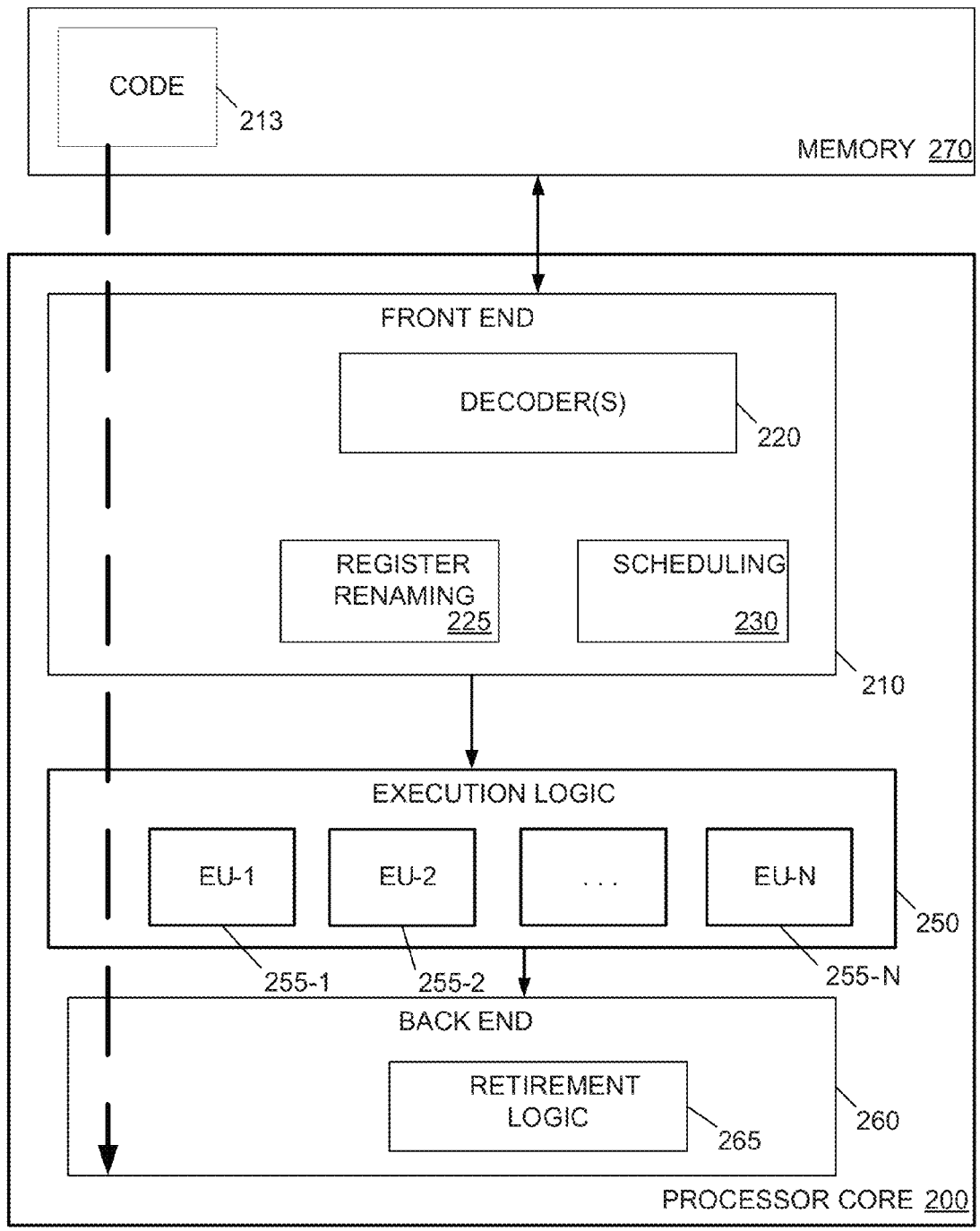
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the logic architecture 430 (FIG. 4) or the logic architecture 532 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 8:
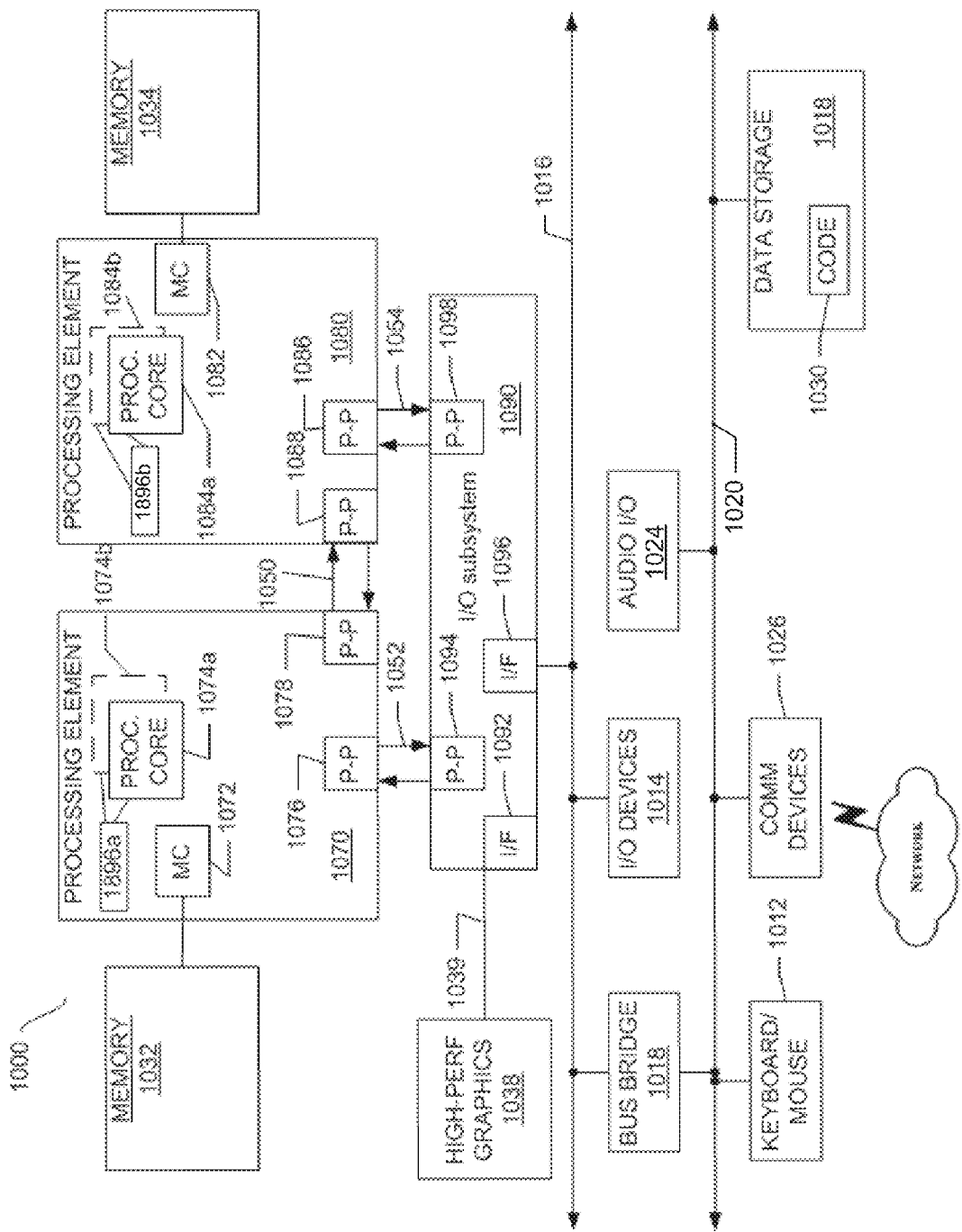
FIG. 8 is a block diagram of an example of a system according to an embodiment.

Referring now to FIG. 8, shown is a block diagram of a system embodiment 1000 in accordance with an embodiment of the present invention. Shown in FIG. 8 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 7.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the present invention is not so limited.

As shown in FIG. 8, various I/O devices 1014 such as the display 496 (FIG. 4) or display 560 (FIG. 5) may be coupled to the first bus 1016, along with a bus bridge 1018 which may couple the first bus 1016 to a second bus 1010. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network), and a data storage unit 1018 such as a disk drive or other mass storage device which may include code 1030, in one embodiment. The code 1030 may include instructions for performing embodiments of one or more of the methods described above. Thus, the illustrated code 1030 may implement the logic architecture 430 (FIG. 4) or the logic architecture 532 (FIG. 5) and could be similar to the code 213 (FIG. 7), already discussed. Further, an audio I/O 1024 may be coupled to second bus 1020.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

Embodiments may include a computer-implemented method in which a high dynamic range image may be received. The computer-implemented method may include performing a global tone map operation on a high dynamic range image. In one embodiment, a global tone map operation may include adjusting a tone curve with one or more global statistics determined from a high dynamic range image to yield a preview image. Moreover, the computer-implemented method may include performing a local tone map operation on a region of interest of a preview image. In one embodiment, a local tone map operation may include adjusting a tone curve with one or more local statistics determined from a region of interest to yield a low dynamic range image.

Additionally, the computer-implemented method may include employing user input data to determine a region of interest. Moreover, the computer-implemented method may employ image view data to yield a low dynamic range image. In one embodiment, the image view data may be employed to convert the region of interest to a region including a user foveal region, to enlarge the region of interest, shrink the region of interest, and so on, or combinations thereof. In addition, the computer-implemented method may include ensuring that a predetermined amount of image pixels are not saturated in a low dynamic range image. In addition, the computer-implemented method may include ensuring that the low dynamic range image includes an amount of image pixels that are not to be clipped.

Additionally, the computer-implemented method may include automatically performing a tone map operation. In one embodiment, a global tone map operation may be automatically performed when a high dynamic range image is provided. Moreover, the computer-implemented method may include automatically performing a local tone map operation. In one embodiment, a local tone map operation may be automatically performed in response to determination of the region of interest.

Embodiments may also include an apparatus to perform tone map operations comprising means for performing any of the aforementioned methods.

Embodiments may also include a computer-readable storage medium having a set of instructions, which, if executed by a processor, may cause a processor to perform a global tone map operation on a high dynamic range image to yield a preview image. In one embodiment, the instructions, if executed, may cause a processor to determine one or more global statistics from a high dynamic range image and to adjust a tone curve based on one or more global statistic to yield the preview image. In addition, the instructions, if executed, may cause a processor to perform a local tone map operation on a region of interest of a preview image to yield a low dynamic range image. In one embodiment, the instructions, if executed, may cause a processor to determine one or more local statistics from a region of interest and to adjust a tone curve based on one or more local statistics to yield a low dynamic range image.

Additionally, the instructions, if executed, may cause a processor to automatically perform a tone map operation. Moreover, the instructions, if executed, may cause a processor to employ user input data to determine a region of interest. In one embodiment, user input data may include pointer data, touch data, gaze data, and so on, or combinations thereof. In addition, the instructions, if executed, may cause a processor to yield a low dynamic range image that includes a percentage of image pixels that are not saturated. In addition, the instruction, is executed, may cause a processor to ensure that a low dynamic range image includes a percentage of image pixels that are not to be clipped. In addition, the instruction, if executed, may cause a processor to employ image view data to yield a low dynamic range image. In one embodiment, image view data may include one or more of a view distance, a display size, a display resolution, and so on, or combinations thereof.

Embodiments may also include an apparatus having logic to yield a low dynamic range image. In one embodiment, the apparatus may include a tone map module to perform a global tone map operation on a high dynamic range image to yield a preview image. In another embodiment, the apparatus may include a tone map module to perform a local tone map operation on a region of interest of a preview image to yield a low dynamic range image.

Additionally, the apparatus may include a tone map module having a global statistics module to determine one or more global statistics from a high dynamic range image. Moreover, the apparatus may include a tone map module having a local statistic module to determine one or more local statistics from a region of interest. In addition, the apparatus may include a tone map module having a tone curve module to adjust a tone curve based on one or more global statistics to yield a preview image and to adjust a tone curve based on one or more local statistics to yield a low dynamic range image.

In addition, the apparatus may include a tone map module having a user interest module to determine a region of interest. In one embodiment, a user interest module may determine a region of interest based on user input data. Moreover, the apparatus may include a sensor to capture data indicative of a region of interest. In one embodiment, the apparatus may include a pointer sensor to capture pointer data, a touch sensor to capture touch data, an image sensor to capture image data, and so on, or combinations thereof.

In addition, the apparatus may include a pixel saturation module to yield a low dynamic range image that includes an amount of image pixels that are not saturated. In addition, the apparatus may include an image view module to provide image view data to yield a low dynamic range image.

Additionally, the apparatus may include a tone map operation to be automatically performed. In one embodiment, a tone map module may automatically perform a global tone map operation when a high dynamic range image is provided. In another embodiment, a tone map module may automatically perform a local tone map operation when a region of interest is determined.

Embodiments may also include a system having logic to yield a low dynamic range image. In one embodiment, the system may include a tone map module to perform a global tone map operation on a high dynamic range image to yield a preview image, and to perform a local tone map operation on a region of interest of a preview image to yield a low dynamic range image, in combination with components such as a power supply, memory, storage, network interface component, and combinations thereof. Moreover, the system may include dedicated components to receive, process, or display an image, such as a dedicated graphic component or a dedicated display component.

Additionally, the system may include a tone map module having a global statistics module to determine one or more global statistics from a high dynamic range image. Moreover, the system may include a tone map module having a local statistic module to determine one or more local statistics from a region of interest. In addition, the system may include a tone map module having a tone curve module to adjust a tone curve based on one or more global statistics to yield a preview image and to adjust a tone curve based on one or more local statistics to yield a low dynamic range image.

Additionally, the system may include a tone map module having a user interest module to determine a region of interest. In one embodiment, a user interest module may determine a region of interest based on user input data. Moreover, the system may include a sensor to capture data indicative of a region of interest. In one embodiment, the system may include a pointer sensor to capture pointer data, a touch sensor to capture touch data, an image sensor to capture image data, and so on, or combinations thereof.

Additionally, the system may include a pixel saturation module to yield a low dynamic range image that includes a percentage of image pixels that are not saturated. In addition, the system may include an image view module to provide image view data to yield a low dynamic range image.

Additionally, the system may include a tone map operation to be automatically performed. In one embodiment, a tone map module may automatically perform a global tone map operation when a high dynamic range image is provided. In another embodiment, a tone map module may automatically perform a local tone map operation when a region of interest is determined.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carries the meaning of "one or more" or "at least one".

Those skilled in the art will appreciate from the foregoing description that the broad techniques of the embodiments can be implemented in a variety of forms. Therefore, while the embodiments have been described in connection with particular examples thereof, the true scope of embodiments should not be so limited since other modifications will become apparent to the skilled practitioner upon a study of the drawings, specification, and following claims.

We claim:

1. A method comprising:
receiving a high dynamic range image;

performing a global tone map operation on the high dynamic range image by adjusting a tone curve associated with the high dynamic range image based on one or more global statistics determined from the high dynamic range image to yield a preview image, wherein adjusting the tone curve increases a visibility of substantially all details in both light and dark regions in the preview image;

employing user input data to determine a region of interest of the preview image; and automatically performing a local tone map operation on the region of interest of the preview image by adjusting the tone curve based on one or more local statistics determined from the region of interest to yield a low dynamic range image, wherein adjusting the tone curve increases a visibility of substantially all details in the region of interest in the low dynamic range image and decreases global contrast of the low dynamic range image to make details only outside of the region of interest less visible than in the preview image.

2. The method of claim 1, further including employing image view data having one or more of a screen size, a screen resolution, or a viewing distance to yield the low dynamic range image.

3. The method of claim 2, wherein the region of interest is enlarged and displayed to the user.

4. The method of claim 1, wherein the local tone map operation ensures that a predetermined amount of image pixels in the low dynamic range image are not saturated.

5. The method of claim 1, further including displaying the low dynamic range image on a display device.

6. The method of claim 1, wherein the global contrast is compromised to make details in regions only outside of the region of interest less visible for a scene as the distance from the region of interest increases in at least one direction, and wherein a visibility of substantially all details in a different region of interest in the same scene is increased and the global contrast is compromised to make details in different regions only outside of the different region of interest less visible in the same scene as a distance from the different region of interest increases in at least one direction.

7. The method of claim 1, wherein the user input data is used to identify at least a point in the preview image that is of interest to a user, wherein the region of interest is automatically selected to be a foveal region of the user with respect to the point, the foveal region being a region that is sampled by the user at maximum resolution in the fovea and is seen in maximum detail, and wherein the global contrast only outside of the foveal region is compromised to make details outside of the foveal region less visible as a distance from the foveal region increases in at least one direction.

8. The method of claim 1, wherein the global tone map operation includes:
determining a minimum pixel value and a maximum pixel value corresponding to a histogram; and
clipping pixel values that fall below the minimum pixel value to the minimum pixel value and pixel values that fall above the maximum pixel value to the maximum pixel value to generate the preview image.

9. The method of claim 1, wherein the local tone map operation includes:
determining a minimum pixel value and a maximum pixel value corresponding to pixels extracted from the region of interest, wherein the minimum pixel value and the maximum pixel value are iteratively modified until a predetermined percentage of pixels that are not to be clipped falls between the minimum pixel value and the maximum pixel value; and
clipping pixel values that fall below the minimum pixel value to the minimum pixel value and pixel values that fall above the maximum pixel value to the maximum pixel value.

10. A computer-readable medium comprising one or more instructions that when executed on a processor cause the processor to:
perform a global tone map operation on a high dynamic range image to yield a preview image, wherein the global tone map operation is to make substantially all details in both light and dark regions visible in the preview image;
employ user input data to determine a region of interest of the preview image; and
perform a local tone map operation on the region of interest of the preview image to yield a low dynamic range image, wherein the local tone map operation is to increase a visibility of substantially all details in the region of interest in the low dynamic range image and is to compromise global contrast of the low dynamic range image to make details only outside of the region of interest less visible than in the preview image.

11. The medium of claim 10, wherein the local tonemap operation is to be automatically performed in response to determination of the region of interest.

12. The medium of claim 10, wherein when executed the one or more instructions cause the processor to:
determine one or more global statistics from the high dynamic range image;
adjust a tone curve based on the global statistics to yield the preview image;
determine one or more local statistics from the region of interest; and
adjust the tone curve based on the local statistics to yield the low dynamic range image.

13. The medium of claim 10, wherein the user input data is to include one or more of pointer data, touch data, or gaze data.

14. The medium of claim 10, wherein the local tone map operation is to ensure that the low dynamic range image includes a percentage of image pixels that are not to be saturated.

15. The medium of claim 14, wherein the local tone map operation is to ensure that the low dynamic range image includes a percentage of the image pixels that are not to be clipped.

16. The medium of claim 10, wherein when executed the one or more instructions cause the processor to employ image view data to yield the low dynamic range image.

17. The medium of claim 16, wherein the image view data is to include one or more of a view distance, a display size, or a display resolution.

18. An apparatus comprising:
a tone map module to perform a global tone map operation on a high dynamic range image to yield a preview image, wherein the global tone map operation is to make substantially all details in both light and dark regions visible in the preview image, the tone map module further to determine a region of interest of the preview image, and the tone map module further to perform a local tone map operation on the region of interest of the preview image to yield a low dynamic range image, wherein the local tone map operation is to increase a visibility of substantially all details in the region of interest in the low dynamic range image and is to compromise global contrast of the low dynamic range image to make details only outside of the region of interest less visible than in the preview image.

19. The apparatus of claim 18, wherein the local tone map operation is to be automatically performed in response to determination of the region of interest.

20. The apparatus of claim 18, wherein the tone map module includes:
   a global statistics module to determine one or more global statistics from the high dynamic range image;
   a local statistic module to determine one or more local statistics from the region of interest; and
   a tone curve module to adjust a tone curve based on the global statistics to yield the preview image and to adjust the tone curve based on the local statistics to yield the low dynamic range image.

21. The apparatus of claim 18, further including a user interest module to determine the region of interest based on user input data.

22. The apparatus of claim 18, further including a pixel saturation module to ensure that the low dynamic range image includes an amount of image pixels that are not to be saturated.

23. The apparatus of claim 18, further including one or more of:
   a pointer sensor to capture pointer data;
   a touch sensor to capture touch data; and
   an image sensor to capture image data.

24. A system comprising:
   a power supply to provide power to the system; and
   a tone map module to perform a global tone map operation on a high dynamic range image to yield a preview image, wherein the global tone map operation is to make substantially all details in both light and dark regions visible in the preview image, the tone map module further to determine a region of interest of the preview image, and the tone map module further to perform a local tone map operation on the region of interest of the preview image to yield a low dynamic range image, wherein the local tone map operation is to increase a visibility of substantially all details in the region of interest in the low dynamic range image and is to compromise global contrast of the low dynamic range image to make details only outside of the region of interest less visible than in the preview image.

25. The system of claim 24, wherein the local tone map operation is to be automatically performed in response to determination of the region of interest.

26. The system of claim 24, wherein the tone map module includes:
   a global statistics module to determine one or more global statistics from the high dynamic range image;
   a local statistic module to determine one or more local statistics from the region of interest; and
   a tone curve module to adjust a tone curve based on the global statistics to yield the preview image and to adjust the tone curve based on the local statistics to yield the low dynamic range image.

27. The system of claim 26, further including a user interest module to determine the region of interest based on user input data.

28. The system of claim 26, further including a pixel saturation module to ensure that the low dynamic range image includes a percentage of image pixels that are not to be saturated.

29. The system of claim 24, further including one or more of:
   a pointer sensor to capture pointer data;
   a touch sensor to capture touch data; and
   an image sensor to capture image data.

* * * * *